(12) United States Patent
Takai et al.

(10) Patent No.: US 7,364,660 B2
(45) Date of Patent: Apr. 29, 2008

(54) POROUS MEMBRANE

(75) Inventors: Masato Takai, Ibaraki (JP); Yoichi Matsumoto, Kurashiki (JP); Kouji Sekiguchi, Kurashiki (JP); Tomoki Kakiuchi, Kurashiki (JP); Hitoshi Tsuruta, Tokyo (JP); Takao Shimizu, Kurashiki (JP)

(73) Assignees: Kuraray Co., Ltd., Kurashiki (JP); Kuraray Medical Inc., Kurashiki (JP)

( * ) Notice: Subject to any disclaimer, the term of this patent is extended or adjusted under 35 U.S.C. 154(b) by 499 days.

(21) Appl. No.: 10/520,864

(22) PCT Filed: Jul. 10, 2003

(86) PCT No.: PCT/JP03/08758

§ 371 (c)(1),
(2), (4) Date: Feb. 25, 2005

(87) PCT Pub. No.: WO2004/006991

PCT Pub. Date: Jan. 22, 2004

(65) Prior Publication Data

US 2005/0145561 A1 Jul. 7, 2005

(51) Int. Cl.
*B01D 39/00* (2006.01)
*B01D 39/14* (2006.01)
*B01D 29/00* (2006.01)
B01D 61/00 (2006.01)
B01D 63/00 (2006.01)

(52) U.S. Cl. ............ 210/500.38; 210/490; 210/500.27; 210/500.37

(58) Field of Classification Search ........... 210/500.27, 210/500.37, 500.38, 645, 490; 526/310; 524/413; 264/41
See application file for complete search history.

(56) References Cited

U.S. PATENT DOCUMENTS

| 4,340,479 | A | * | 7/1982 | Pall ............................. 210/490 |
| 4,707,265 | A | * | 11/1987 | Barnes et al. ................ 210/638 |
| 4,935,141 | A | * | 6/1990 | Buck et al. ............. 210/500.38 |
| 5,006,247 | A | * | 4/1991 | Dennison et al. ....... 210/500.38 |
| 5,868,936 | A | | 2/1999 | Ofsthun et al. |
| 5,871,649 | A | | 2/1999 | Ofsthun et al. |
| 6,846,868 | B2 | * | 1/2005 | Oka et al. .................... 524/413 |
| 7,094,851 | B2 | * | 8/2006 | Wu et al. .................... 526/247 |
| 7,223,341 | B2 | * | 5/2007 | Wu et al. .............. 210/500.37 |
| 2005/0119444 | A1 | * | 6/2005 | Crombach et al. .......... 528/310 |

FOREIGN PATENT DOCUMENTS

| JP | 10-263375 A | | 10/1998 |
| JP | 2000-153134 A | | 6/2000 |
| JP | 2000-178368 | * | 6/2000 |
| JP | 2000-178368 A | | 6/2000 |
| JP | 2000-186141 A | | 7/2000 |
| JP | 2001-328681 A | | 11/2001 |
| TW | 389705 | | 5/2000 |

* cited by examiner

*Primary Examiner*—Ana Fortuna
(74) *Attorney, Agent, or Firm*—Leydig, Voit & Mayer, Ltd.

(57) ABSTRACT

A polyamide having an equilibrium water absorption of not more than 10% is used as a main material. As a polyamide having an equilibrium water absorption of not.more than 10%, for example, a polyamide comprising a dicarboxylic acid component comprising 60-100 mol % of terephthalic acid and a diamine component comprising 60-100 mol % of 1,9-nonanediamine and/or 2-methyl-1,8-octanediamine is used. As a result, a porous membrane showing extremely small dimensional change even after a hot water treatment, and particularly useful as a medical separation membrane permitting an AC sterilization treatment and the like is obtained.

13 Claims, No Drawings

POROUS MEMBRANE

TECHNICAL FIELD

The present invention relates to a porous membrane, particularly a porous membrane useful as a medical separation membrane.

BACKGROUND ART

Porous membranes are widely used in various fields. Of these, a medical separation membrane, particularly a hemodialysis membrane, comprises natural polymer membranes made from cellulose and the like, and synthetic polymer membranes made from polysulfone, polymethyl methacrylate, ethylene-vinylalcohol copolymer, polyacrylonitrile, polyamide, polyallylether sulfone, polyester polymer alloy and the like.

Of the synthetic polymer membranes, a membrane using polyamide has been widely employed for medical use and the like, since it is superior in biocompatibility and free of bisphenol A, which is an endocrine disrupter feared to exert an adverse influence on human body, as a constitution component, and the like.

While medical separation membranes are always subjected to a sterilization treatment, autoclave sterilization (AC sterilization), which includes treatment with hot water, is widely used as one of the sterilization methods because of high safety and the like. However, since polyamide membranes generally show high water absorbability and they show degraded mechanical property in water absorption state, their size and structure vary particularly when treated with hot water, and AC sterilization has been difficult to apply.

JP-A-7-256067 describes a permselective membrane made from polyamide, which has a water content of not less than 8 wt % and heat of crystallization of not more than 30 mJ/mg. While this publication admits a disadvantage of polyamide membrane in the resistance to AC sterilization because higher water contents are associated with lower heat resistance when the membrane contains water, it concludes that AC sterilization of polyamide having a high water content is possible at 121° C., when the glass transition point of the dry resin is not less than 130° C. According to the study of the present inventors, however, it has been clarified that even a membrane produced using such polyamide fails to show sufficient dimensional stability and the like under AC sterilization conditions, and the AC sterilization markedly degrades membrane performance.

In view of the above-mentioned situation, the present invention aims at providing a porous membrane made from polyamide as a main material, which is useful as a medical separation membrane and the like, shows extremely small dimensional changes during a hot water treatment, and which particularly permits an AC sterilization treatment.

DISCLOSURE OF THE INVENTION

The present inventors have conducted intensive studies in an attempt to achieve the aforementioned objects and found that the use of a polyamide having low equilibrium water absorption as a material of a membrane enables provision of a membrane superior in hot water resistance. In addition, they have found that, particularly, a medical separation membrane made of a hollow fiber membrane comprising a polyamide having an equilibrium water absorption of not more than 10% as a main material has high dimensional stability under AC sterilization conditions, which resulted in the completion of the present invention.

Accordingly, the present invention provides the following:

(1) a porous membrane comprising a polyamide having an equilibrium water absorption of not.more than 10% as a main material, (2) the porous membrane of the above-mentioned (1), wherein the polyamide having an equilibrium water absorption of not more than 10% comprises a dicarboxylic acid component comprising 60-100 mol % of terephthalic acid and a diamine component comprising 60-100 mol % of 1,9-nonanediamine and/or 2-methyl-1,8-octanediamine, (3) the porous membrane of the above-mentioned (1), wherein the polyamide having an equilibrium water absorption of not more than 10% is contained in a proportion of 50-100 wt % in the material, (4) the porous membrane of the above-mentioned (1), wherein the material further comprises polyvinylpyrrolidone, (5) the porous membrane of the above-mentioned (2), wherein a molar ratio of the 1,9-nonanediamine and 2-methyl-1,8-octanediamine in the diamine component is 100:0-10:90, (6) the porous membrane of the above-mentioned (1), wherein the polyamide having an equilibrium water absorption of not more than 10% comprises a molecular chain terminal group blocked with a terminal blocking agent by not less than 10% thereof, (7) the porous membrane of the above-mentioned (6), wherein the terminal blocking agent is benzoic acid, (8) the porous membrane of the above-mentioned (1), wherein the polyamide having an equilibrium water absorption of not more than 10% has a glass transition point of not less than 60° C., (9) the porous membrane of the above-mentioned (1), wherein the polyamide having an equilibrium water absorption of not more than 10% shows an intrinsic viscosity of 0.4-3.0 dl/g as measured in concentrated sulfuric acid at 30° C.,

(10) the porous membrane of the above-mentioned (1), which has a membrane thickness of 3-2000 μm,

(11) the porous membrane of the above-mentioned (1), which is an asymmetric membrane comprising-a dense layer and a support layer,

(12) the porous membrane of the above-mentioned (11), wherein the dense layer has an average surface roughness of 1-10 nm,

(13) the porous membrane of the above-mentioned (11), wherein the support layer comprises pores having an average pore size of 0.01-100 μm on the surface,

(14) the porous membrane of the above-mentioned (1), which has a $\beta_2$-microglobulin clearance of not less than 35 mL/min.

BEST MODE FOR EMBODYING THE INVENTION

The porous membrane of the present invention is characterized by the use of a polyamide having an equilibrium water absorption of not more than 10% as a main material.

As used herein, by the "equilibrium water absorption" is meant a value measured by the method shown in (i) equilibrium water absorption to be mentioned later in [Examples]. In addition, by the "use of a polyamide having an equilibrium water absorption of not more than 10% as a main material" is meant that a material of a porous membrane (namely, a polymer material forming the skeleton of a porous membrane) comprises a polyamide having an equilibrium water absorption of not more than 10% or the polyamide and other polymers (optional component).

The polyamide having an equilibrium water absorption of not more than 10% to be used in the present invention preferably shows an equilibrium water absorption of not more than 7%, more preferably not more than 5%.

In the present invention, a polyamide having an equilibrium water absorption of not more than 10% is realized by, for example, a polyamide comprising a dicarboxylic acid component comprising 60-100 mol % of terephthalic acid and a diamine component comprising 60-100 mol % of 1,9-nonanediamine and/or 2-methyl-1,8-octanediamine. When the amount of terephthalic acid in the dicarboxylic acid component is less than 60 mol % or the amount of 1,9-nonanediamine and/or 2-methyl-1,8-octanediamine in the diamine component is less than 60 mol %, a porous membrane comprising such a polyamide tends to show degraded hot water resistance.

In this polyamide, the amount of terephthalic acid in the dicarboxylic acid component is preferably 75-100 mol %, more preferably 90-100 mol %. When the amount of terephthalic acid in the dicarboxylic acid component is within the preferable range, the obtained polyamide becomes superior in the heat resistance, mechanical property and the like, further improving the dimensional stability during hot water treatment of the object porous membrane. As the dicarboxylic acid component other than terephthalic acid, for example, aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, suberic acid, dimer acid and the like; alicyclic dicarboxylic acids such as 1,3-cyclopentanedicarboxylic acid, 1,4-cyclohexanedicarboxylic acid and the like; aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, dibenzoic acid, 4,4'-oxydibenzoic acid, diphenylmethane-4,4'-dicarboxylic acid, diphenylsulfone-4,4'-dicarboxylic acid, 4,4'-biphenyldicarboxylic acid and the like; and the like can be contained, which may be one or more kinds.

In the polyamide, moreover, the amount of 1,9-nonanediamine and/or 2-methyl-1,8-octanediamine in the diamine component is preferably 75-100 mol %, more preferably 90-100 mol %. When the amount of 1,9-nonanediamine and/or 2-methyl-1,8-octanediamine in the diamine component is within the preferable range, the obtained polyamide becomes superior in low water absorption, heat resistance and the like, further improving the dimensional stability during hot water treatment of the object porous membrane. In the 1,9-nonanediamine (NMDA) and/or 2-methyl-1,8-octanediamine (MODA), the proportion thereof is preferably NMDA:MODA (molar ratio) of 100:0-10:90, more preferably 95:5-20:80, and particularly preferably 90:10-40:60. As the diamine component other than 1,9-nonanediamine and 2-methyl-1,8-octanediamine, for example, straight chain aliphatic diamines such as 1,6-hexanediamine, 1,7-heptanediamine, 1,8-octanediamine, 1,10-decanediamine, 1,11-undecanediamine, 1,12-dodecanediamine and the like; branched chain diamines such as 2-methyl-1,5-pentanediamine, 3-methyl-1,5-pentanediamine, 2,2,4-trimethyl-1,6-hexanediamine, 2,4,4-trimethyl-1,6-hexanediamine, 5-methyl-1,9-nonanediamine and the like; alicyclic diamines such as cyclohexanediamine, methylcyclohexanediamine, isophoronediamine, bis(4-aminocyclohexyl) methane, norbornanedimethylamine, tricyclodecanedimethylamine and the like; aromatic diamines such as p-phenylenediamine, m-phenylenediamine, xylenediamine, 4,4'-diaminodiphenylsulfone, 4,4'-diaminodiphenylether and the like; and the like can be contained, which may be one or more kinds. Of these, 1,7-heptanediamine, 1,8-octanediamine, 1,10-decanediamine, 1,11-undecanediamine and 1,12-dodecanediamine are preferable because the obtained polyamide is superior in various properties.

For controlling the molecular weight, not less than 10% of the molecular chain terminal group of polyamide is preferably blocked with a terminal blocking agent, wherein the blocking rate of the terminal group is more preferably not less than 40%, further preferably not less than 60% and particularly preferably not less than 70%. The terminal blocking agent is free of any particular limitation as long as it is a monofunctional compound having reactivity with amino group or carboxyl group on the polyamide terminal. From the aspects of reactivity, safety of the blocked terminal and the like, monocarboxylic acid and monoamine are preferable, and from the aspects of easy handling and the like, monocarboxylic acid is more preferable. Other than these, acid anhydrides such as phthalic anhydride and the like, monoisocyanate, monoacid halide, monoesters, monoalcohols and the like can be also used.

The monocarboxylic acid that can be used as a terminal blocking agent is free of any particular limitation as long as it has reactivity with amino group and, for example, aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid, isobutyric acid and the like; alicyclic monocarboxylic acids such as cyclohexanecarboxylic acid and the like; aromatic monocarboxylic acids such as benzoic acid, toluic acid, α-naphthalenecarboxylic acid, β-naphthalenecarboxylic acid, methylnaphthalenecarboxylic acid, phenylacetic acid and the like, and a mixture of any of these can be mentioned. Of these, from the aspects of reactivity, safety of the blocked terminal, cost and the like, acetic acid, propionic acid, butyric acid, valeric acid, caproic acid, caprylic acid, lauric acid, tridecylic acid, myristic acid, palmitic acid, stearic acid and benzoic acid are particularly preferable.

As the monoamine that can be used as a terminal blocking agent is free of any particular limitation as long as it has reactivity with carboxyl group and, for example, aliphatic monoamines such as methylamine, ethylamine, propylamine, butylamine, hexylamine, octylamine, decylamine, stearylamine, dimethylamine, diethylamine, dipropylamine, dibutylamine and the like; alicyclic monoamines such as cyclohexylamine, dicyclohexylamine and the like; aromatic monoamines such as aniline, toluidine, diphenylamine, naphthylamine and the like, and a mixture of any of these can be mentioned. Of these, from the aspects of reactivity, high boiling point, stability of blocked terminal, cost and the like, butylamine, hexylamine, octylamine, decylamine, stearylamine, cyclohexylamine and aniline are particularly preferable.

The polyamide can be produced using any method known as a method of producing crystalline polyamide. For example, it can be produced by methods such as a melt polymerization method or an interfacial polymerization method using acid chloride and diamine as starting materials; melt polymerization method, solid phase polymerization method, melt extruder polymerization method and the like using dicarboxylic acid and diamine as starting materials. For the purpose of preventing increase in the polycondensation rate and deterioration of polyamide produced during polymerization for production of polyamide, a phosphorus catalyst such as phosphoric acid, phosphorous acid, hypophosphorous acid, or a salt thereof, an ester thereof and the like is preferably added to the reaction system. Of these, in view of the quality of the resulting polyamide, hypophosphorous acid derivatives (hypophosphorous acid salt, hypophosphorous acid ester etc.) are preferable, and sodium hypophosphite is particularly preferable in view of the cost and easy handling. The amount of these phosphorus catalysts to be added is preferably 0.01-5 wt %, more preferably 0.05-2 wt %, and particularly preferably 0.07-1 wt %, relative to the total weight of dicarboxylic acid and diamine. While the amount of the above-mentioned terminal blocking agent to be used varies depending on the reactivity and boiling point of the terminal blocking agent to be used, reactor, reaction conditions and the like, it is generally within the range of 0.1-15 mol % of the total number of moles of dicarboxylic acid and diamine.

It is preferable that the polyamide to be used in the present invention have a high glass transition point in a dry state and a glass transition point of not less than 60° C. is preferable, not less than 80° C. is more preferable, and not less than 100° C. is particularly preferable. When the glass transition point is not less than 60° C., the object porous membrane becomes more superior in the heat resistance, and the dimensional stability during hot water treatment is further improved. As used herein, the glass transition point refers to an intermediate temperature between two inflection points observed near the glass transition temperature when measured by raising temperature from 30° C. to 200° C. at 10° C./min using DSC (Mettler-Toledo International Inc.: DSC30).

The polyamide to be used in the present invention preferably has an intrinsic viscosity [η] of 0.4-3.0 dl/g, more preferably 0.6-2.0 dl/g, and particularly preferably 0.8-1.8 dl/g, as measured in concentrated sulfuric acid at 30° C. When the intrinsic viscosity [η] is lower than the above-mentioned range, the mechanical strength of the object porous membrane tends to decrease. When the intrinsic viscosity [η] is higher than the above-mentioned range, solubility in a solvent during preparation of film forming dope to be mentioned later and the film forming dope tends to increase the viscosity to lower the film formability.

The intrinsic viscosity [η] was measured by dissolving polyamide in concentrated sulfuric acid to give sample solutions having a concentration of 0.05, 0.1, 0.2 and 0.4 g/dl, measuring the flow time (sec) of sample solutions having respective concentrations at 30° C., calculating the intrinsic viscosity (ηinh) of the following samples from the following formula, and extrapolating the value into concentration 0.

$$\eta inh = [ln\ (t_1/t_0)]/c$$

wherein ηinh is intrinsic viscosity (dl/g), $t_0$ is flow time (sec) of solvent, $t_1$ is flow time (sec) of sample solution, and c is concentration (g/dl) of the sample in the solution.

While the production method of the porous membrane of the present invention is not particularly limited, for example, the membrane can be preferably produced by the following method.

First, a film forming dope containing a polymer and a solvent, or a film forming dope further containing additives as necessary is prepared. The polymer to be used here may be a polyamide having an equilibrium water absorption of not more than 10% alone or may contain other polymer as necessary. The concentration composition of the polyamide in the film forming dope needs only to fall within the range permitting film forming and function as a membrane, and is preferably 5-50 wt %. Particularly, when a medical separation membrane (particularly one made of hollow fiber membrane) is to be prepared, the concentration of polyamide is preferably 10-30 wt % because a membrane having high permeability and mechanical strength can be obtained. On the other hand, when a different polymer is to be added for the purpose of imparting hydrophilicity, improving biocompatibility, improving viscosity and the like, such polymer may be added to a film forming dope in a proportion of 0-20 wt %, preferably 0-10 wt %. As such polymer, one or more kinds selected from the group consisting of polyvinylpyrrolidone (PVP), polyethylene glycol, polyethylene glycol monoester, copolymer of polyethylene-glycol and polypropylene glycol, polyvinyl alcohol, ethylene-vinyl alcohol copolymer, water-soluble derivative of cellulose, polysorbate, polymethoxyethyl acrylate, polyhydroxyethyl methacrylate and the like can be mentioned.

The solvent may be any as long as it can dissolve polymer, or polymer and additive, and, for example, N-methyl-2-pyrrolidone (NMP), N,N-dimethylacetamide (DMAc), dimethyl sulfoxide (DMSO), dimethylformamide (DMF), N-methylmorpholineoxide (NMMO) and the like can be mentioned, which may be used alone or in a mixture of two or more kinds thereof.

An additive is used for controlling phase separation temperature and viscosity of film forming dope or improving film formability, and, for example, water and the like can be mentioned. The concentration range of water is 0-10 wt %, preferably 0-5 wt %, of a film forming dope. With the aim of controlling the dissolution state of a film forming dope, and improving film formability, salt and the like may be added. As the kind of salt, for example, one or more kinds selected from the group consisting of lithium chloride, sodium chloride, calcium chloride, lithium acetate and lithium nitrate can be mentioned. As for the amount of the salt to be added, it is any amount according to the combination of polymer, solvent and additive.

A film forming dope is prepared by mixing a polymer and a solvent (and additive to be used as necessary) at a high temperature (generally 60-150° C.). Then, in the case of a hollow fiber, for example, the prepared film forming dope is extruded from a double annular nozzle while injecting, into the inside from a double annular nozzle, a hollow-forming agent such as a coagulation liquid or a non-coagulative solvent (solvent that prevents coagulation of film forming dope) and the like to be mentioned later, and, if necessary, introducing into the coagulation liquid to achieve film forming. The coagulation liquid may be contacted with the film forming dope only in the inside of the hollow fiber, on the outside alone or on both sides. In the case of a flat membrane, a film forming dope is cast on a cast plate to allow immersion in a coagulation liquid and the like to achieve film forming.

As the coagulation liquid, any can be used without particularly limitation as long as it has an action to coagulate a polymer to be the material of a membrane and is miscible with the solvent of a film forming dope. As the kind of the coagulation liquid, for example, water; a mixture of a water-soluble solvent such as NMP, DMAc, DMSO, DMF, NMMO and the like with water and the like can be mentioned. Where necessary, an aqueous solution containing salts such as lithium chloride, sodium chloride, calcium chloride, lithium acetate, lithium nitrate and the like; polymers such as PVP, polyethylene glycol, polyethylene glycol monoester, copolymer of polyethylene glycol and polypropylene glycol, polyvinyl alcohol, ethylene-vinyl alcohol copolymer, water-soluble derivative of cellulose, polysorbate, polymethoxyethyl acrylate, polyhydroxyethyl methacrylate and the like, and the like can be also used. When a coagulation liquid is contacted with a film forming dope only in the inside of a hollow fiber, a gas such as nitrogen, air and the like or a non-coagulative solvent such as hexane and the like, and the like can be used on the outside of the hollow fiber. When the coagulation liquid is contacted only with the outside of the hollow fiber, a gas such as nitrogen, air and the like or a non-coagulative solvent such as hexane and the like can be used in the inside of the hollow fiber. The membrane after contact with a coagulation liquid is washed with water, and dried and heat-treated as necessary. Then, it is incorporated into a module by a known method and used as various industrial or medical membranes.

The main material (polymer) in the porous membrane of the present invention is a polyamide having an equilibrium water absorption of not more than 10% (e.g., a polyamide comprising a dicarboxylic acid component comprising 60-100 mol % of terephthalic acid and a diamine component comprising 60-100 mol % of 1,9-nonanediamine and/or 2-methyl-1,8-octanediamine), and may contain a polymer selected from the group consisting of PVP, polyethylene glycol, polyethylene glycol monoester, copolymer of polyethylene glycol and polypropylene glycol, polyvinyl alcohol, ethylene-vinyl alcohol copolymer, water-soluble derivative of cellulose, polysorbate, polymethoxyethyl acrylate, polyhydroxyethyl methacrylate and the like as other polymer.

It is preferable to contain polyamide in a proportion of 50-100 wt %, more preferably 60-100 wt %, and still more preferably 70-100 wt %, of the total polymer constituting the porous membrane.

The porous membrane of the present invention may be a hollow fiber membrane or a flat membrane. Since the membrane area per unit volume can be increased and small sized membrane can be produced, a hollow fiber membrane is preferable as a medical separation membrane. In the case of a hollow fiber membrane, the membrane thickness is preferably within the range of 3-2000 µm, more preferably 10-1000 µm, still more preferably 10-400 µm, to ensure spinnability and mechanical strength and permeability of the membrane. In addition, the outer diameter of a hollow fiber membrane is preferably within the range of 40-5000 µm, more preferably 40-3000 µm, still more preferably 100-1000 µm. In the case of a flat membrane, the membrane thickness is preferably within the range of 3-2000 µm, more preferably 10-1000 µm, particularly preferably 10-400 µm.

The porosity (%) of the porous membrane of the present invention is preferably 20-90%, more preferably 60-90%, from the aspects of permeability and mechanical strength of the membrane. The porosity (%) here is calculated by the following formula.

Porosity (%)=$\{(W_W-W_D)/\rho_W\}/\{W_D/\rho_E+(W_W-W_D)/\rho_W\} \times 100$ wherein $W_W$ is the weight of water-containing membrane, $W_D$ is the weight of dry membrane, $\rho_W$ is specific gravity of water and $\rho_E$ is specific gravity of polymer constituting the porous membrane.

While the size of void varies depending on the use of the porous membrane, an average pore size is preferably within the range of 0.2-50 µm, more preferably 0.3-3 µm. As used herein, the average pore size is a value obtained by drawing a straight line perpendicular to the membrane surface on an electron micrograph (maximum magnification ×6000) of a section perpendicular to the film forming direction (extrusion direction or cast direction of film forming dope), measuring, with regard to all the voids on the straight line, the length of the part where the straight line pass through the voids, and averaging the measured lengths.

The structure of the porous membrane of the present invention may be a homogeneous (porous structure) membrane or an asymmetric (porous structure) membrane. In the case of a medical separation membrane, an asymmetric membrane having a dense layer that defines fractionation ability and a support layer having mechanical strength and high permeability, which functions as a support of the above-mentioned dense layer, is preferable. In the case of a medical separation membrane comprising a hollow fiber membrane, an inner layer is preferably a dense layer and the outer layer is preferably a support layer. To prevent invasion of a contaminant substance and the like, it is also possible to make a dense outermost layer, i.e., a membrane structure of dense layer (inner layer)-support layer (intermediate layer)-dense layer (outer layer). As the structure of a support layer constituting an asymmetric membrane, for example, a network gradient structure wherein the pore size increases from the dense layer (inner layer) toward the outside, a network homogeneous structure wherein the pore size is generally uniform in the entire membrane thickness direction, a finger void structure having finger like crude large pores and the like can be mentioned. Of these, a network gradient structure is preferable in the case of a medical separation membrane.

When the porous membrane of the present invention is an asymmetric membrane, the thickness of the dense layer is preferably about 0.05-10 µm, more preferably about 0.1-2 µm. The average pore size of a dense layer is preferably within the range of 1-2000 nm, more preferably 5-500 nm. As used herein, the average pore size of the dense layer is a value obtained by drawing a straight line perpendicular to the membrane surface on an electron micrograph (maximum magnification ×60000) of a section perpendicular to the film forming direction (extrusion direction or cast direction of film forming dope), measuring, with regard to all the voids on the straight line in the dense layer, the length of the part where the straight line pass through the voids, and averaging the measured lengths. While the surface of the dense layer may or may not substantially have irregularities, since the structure of the dense layer influences fractionation performance, the surface is preferably formed to have irregularities due to plural protrusions to achieve high permeability. Particularly, for use as a medical separation membrane, the average roughness of the surface of the dense layer is preferably within the range of 1-10 nm, more preferably 3-10 nm. The average roughness here can be determined by measuring the shape of the surface (observation area 5 µm square) in a tapping mode at a measurement frequency of 0.5 Hz using an atom force microscopic device (e.g., Dimension 3100, Digital Instrument Inc.), and analyzing the obtained measurement data with the data processing software attached to the device. To be specific, the measuring software of the device is changed to an Off-line Mode, big swell in the data is flattened by a Modify/Flatten command, sectional shape is obtained from the measurement data by an Analysis/Section command, and the roughness (Ra) of the flat direction length 5 µm calculated then is taken as the average roughness.

When the porous membrane of the present invention is to be an asymmetric membrane (membrane consisting of a dense layer and a support layer), the average pore size of the support layer is preferably within the range of 0.2-50 μm, more preferably 0.3-3 μm. As used herein, the average pore size is a value obtained by drawing a straight line perpendicular to the membrane surface on an electron micrograph (maximum magnification ×6000) of a section perpendicular to the film forming direction (extrusion direction or cast direction of film forming dope), measuring, with regard to all the voids on the straight line in the support layer, the length of the part where the straight line pass through the voids, and averaging the measured lengths. To keep high diffusion permeability, the surface of the support layer preferably has pores made by opening a part of the structure of the support layer, which have an average pore size of 0.01-100 μm, more preferably an average pore size of 0.1-10 μm. As used herein, the average pore size of the pores in the support layer surface is obtained by measuring the longest diameter and the shortest diameter of the pore in an electron micrograph (maximum magnification ×6000) of the surface and averaging the measures.

The porous membrane of the present invention has high fractionation ability and high permeability, and is particularly useful as a medical separation membrane, and extremely useful as a hemodialysis membrane among others. When the membrane of the present invention is contacted with the blood, hemolysis or thrombus causing practical problems does not occur, and the membrane has sufficient blood compatibility for medical use. When the porous membrane of the present invention is used as a hemodialysis membrane, high rejection rate of albumin and high permeability of urea can be concurrently afforded, and high rejection rate of albumin and high permeability of urea and $\beta_2$-microglobulin ($\beta_2$-MG) are preferably afforded concurrently. Specifically, albumin can be preferably prevented by not less than 90%, more preferably not less than 97%, still more preferably not less than 99%. In addition, urea clearance of not less than 125 mL/min, more preferably not less than 175 mL/min, more preferably not less than 185 mL/min, can be achieved. The $\beta_2$-MG clearance of preferably not less than 35 mL/min, more preferably not less than 45 mL/min, can be achieved. The performances shown here (high rejection rate of albumin, high urea permeability, high $\beta_2$-MG permeability) are measured by the measurement methods of (iv) urea clearance, $\beta_2$-MG clearance and albumin rejection in the following Examples.

The porous membrane of the present invention shows lower water absorption of the main material polyamide as compared to this kind of conventional porous membranes, and therefore, has fine hot water resistance. When particularly used as a medical separation membrane, therefore, the following superior characteristics are observed under AC sterilization conditions.

(1) Dimensional changes due to hot water treatment are small.

(2) A hot water treatment does not cause agglutination of membranes.

(3) A hot water treatment does not affect membrane performance.

EXAMPLES

The present invention is explained in detail in the following by referring to Examples, which are not to be construed as limitative. The equilibrium water absorption, rate of changes in fiber length, rate of changes in inner diameter, rate of changes in membrane thickness and membrane performance were evaluated by the following methods.

(i) Equilibrium Water Absorption

Resin chips were injection formed into rectangle strips (length 73.0 mm×width 12.5 mm×thickness 2.0 mm). They were heated in hot water at 128° C. for 2 hrs and stood still in water at 25° C. for 2 days. The weight before and after the hot water treatment was measured.

Equilibrium water absorption [%]=$(W–D)/W$×100

W: weight after hot water treatment
D: weight before hot water treatment (ii) Rate of Changes in Fiber Length A hollow fiber containing water was cut out in length 20 cm and stood still in hot water at 121° C. for 20 min (AC sterilization), and the fiber length was measured again.

Fiber length change [%]=$(L–20)/20$×100

L: length (cm) of hollow fiber after standing still in hot water (iii) Rate of Changes in Inner Diameter, Rate of Changes in Membrane Thickness A hollow fiber membrane before and-after standing still in hot water at 121° C. for 20 min (AC sterilization) was cut with a razor. The sectional shape was observed with an optical microscope and the inner diameter and membrane thickness were measured.

Inner diameter change [%]=$(Li, a–Li, b)/Li, b$×100

Membrane thickness change [%]=$(Lt, a–Lt, b)/Lt, b$×100

Li,a: inner diameter of hollow fiber before standing still in hot water (AC sterilization)
Lt,a: thickness of hollow fiber before standing still in hot water (AC sterilization)
Li,b: inner diameter of hollow fiber after standing still in hot water (AC sterilization)
Lt,b: thickness of hollow fiber after standing still in hot water (AC sterilization)

(iv) Urea Clearance (UREA CL), $\beta_2$-MG Clearance ($\beta_2$-MG CL), rejection of albumin (Rej):

According to the evaluation criteria for dialyzer property [authored by T. Satoh et al.: Kakushu no Ketsuekijokaho no Kino to Tekio—Ketsuekijokaki no Seinohyokaho to Kinobunrui (Functions and Application of Various Methods for Hemopurification Devices) Tosekikaishi, published by Shadanhojin Nippon Toseki Igakukai, 29(8), 1231-1245, 1996], the measurement was done in bovine blood system (filtration flow rate QF'=10 mL/min/m$^2$). The membrane area was 1.6 m$^2$.

Example 1

Equilibrium water absorption of polyamide (PA9MT) obtained from terephthalic acid as a dicarboxylic acid component, NMDA and MODA as diamine components, benzoic acid (molar ratio; terephthalic acid:benzoic acid:NMDA:MODA=1.97:0.06:1:1) as a terminal blocking agent, and phosphorous acid (0.1 wt % of starting material) as a catalyst, which had an intrinsic viscosity [η] of 1.37 dl/g and glass transition point of 125° C. was measured. Then, a film forming dope containing this polyamide (15 wt %), PVP (K-90, BASF, 3 wt %), water (2 wt %), LiCl (5 wt %) and NMP (75 wt %) was prepared. This dope was discharged into the air at 60° C. from a spinneret using water as a hollow-forming agent, led into water to allow solidification, washed with water and dried.

A hollow fiber 1 was pulled out from the obtained hollow fiber bundle and cut into a length of 20 cm. A hollow fiber 2 was pulled out from the remaining hollow fiber bundle and modulated by a known method to give module 1 and module 2. A hollow fiber 3 was further pulled out from the remaining hollow fiber bundle and an inner diameter, a membrane thickness and average roughness of the inner surface of a dense layer were measured, as well as the membrane structure was observed. The membrane structure was observed with a scanning electron microscope (S-3500N, Hitachi Science Systems, Ltd.). As a result, it was found that the inner layer was a dense layer, the outer layer was a support layer also acting as a support of the above-mentioned dense layer, which had a network gradient structure having increasing pore size from the above-mentioned dense layer toward the outside, and pores having an average pore size of 1.0 μm were formed on the outer surface of the support layer. Moreover, the average roughness of the inner surface of the dense layer was 5.1 nm. The detail of the membrane structure (structure of support layer, average pore size of outer surface of support layer, average roughness of inner surface of dense layer) and the size of the hollow fiber (outer diameter, inner diameter, membrane thickness) are shown in Table 3.

The hollow fiber 1 and module 2 were stood still in water at 121° C. for 20 min (AC sterilization). Using the hollow fiber 1 after the hot water treatment (AC sterilization), the fiber length, inner diameter and membrane thickness were measured.

Using module 1 before hot water treatment (AC sterilization) and module 2 after treatment, membrane performance (urea clearance, $\beta_2$-MG clearance and albumin rejection) were measured. At this time, hemolysis or thrombus causing practical problem did not occur.

The membrane performance before and after the hot water treatment (AC sterilization) and changes in size (fiber length·inner diameter·membrane thickness) due to the hot water treatment are shown in Table 4. Agglutination of hollow fiber membranes due to the hot water treatment (AC sterilization) did not occur.

Examples 2-9

In the same manner as in Example 1, equilibrium water absorption of polyamide obtained from dicarboxylic acid component (terephthalic acid), diamine components (NMDA, MODA) and terminal blocking agent (benzoic acid) at the molar ratio shown in Table 1 was measured. Using this polyamide, each component shown in Table 2 was added at a given wt % to give a film forming dope, from which a hollow fiber bundle was prepared. In the same manner as in Example 1, with regard to the hollow fiber and module obtained from this hollow fiber bundle, the detail of the membrane structure (structure of support layer, average pore size of outer surface of support layer, average roughness of inner surface of dense layer) and the size of the hollow fiber (outer diameter, inner diameter, membrane thickness) are shown in Table 3, membrane performance (urea clearance, $\beta_2$-MG clearance and albumin rejection) before and after the hot water treatment (AC sterilization), changes in size (fiber length·inner diameter·membrane thickness) due to the hot water treatment (AC sterilization), and occurrence or otherwise of hemolysis and thrombus are shown in Table 4. Agglutination of hollow fiber membranes due to the hot water treatment (AC sterilization) did not occur.

Comparative Example 1

The equilibrium water absorption of "Trogamide T-5000" (trimethylhexamethyleneterephthalamide (PA6-3-T), Degussa AG, glass transition point 148° C.) was measured. Then, a film forming dope containing this polyamide (15 wt %), PVP (K-90, BASF, 3 wt %), water (2 wt %) and DMSO (80 wt %) was prepared. Using this dope and in the same manner as in Example 1, a hollow fiber bundle was obtained. In the same manner as in Example 1, with regard to the hollow fiber and module obtained from this hollow fiber bundle, the detail of the membrane structure (structure of support layer, average pore size of outer surface of support layer, average roughness of inner surface of dense layer) and the size of the hollow fiber (outer diameter, inner diameter, membrane thickness) are shown in Table 3, membrane performance (urea clearance, $\beta_2$-MG clearance and albumin rejection) before and after the hot water treatment (AC sterilization), changes in size (fiber length—inner diameter—membrane thickness) due to the hot water treatment (AC sterilization), and occurrence or otherwise of hemolysis and thrombus are shown in Table 4. Agglutination of hollow fiber membranes occurred due to the hot water treatment (AC sterilization).

Comparative Example 2

The equilibrium water absorption of "Novamid X-21" (polyamide (PA6IT) made from diamine unit comprising hexamethylenediamine unit, and dicarboxylic acid unit comprising terephthalic acid unit and isophthalic acid-unit, Mitsubishi Engineering-Plastics Corporation, glass transition point 124° C.) was measured. Then, a film forming dope containing this polyamide (13 wt %), PVP (K-90, BASF, 2 wt %) and DMSO (85 wt %) was prepared. Using this dope and in the same manner as in Example 1, a hollow fiber bundle was obtained. In the same manner as in Example 1, with regard to the hollow fiber and module obtained from this hollow fiber bundle, the detail of the membrane structure (structure of support layer, average pore size of outer surface of support layer, average roughness of inner surface of dense layer) and the size of the hollow fiber (outer diameter, inner diameter, membrane thickness) are shown in Table 3, membrane performance (urea clearance, $\beta_2$-MG clearance and albumin rejection) before and after the hot water treatment (AC sterilization), changes in size (fiber length·inner diameter·membrane thickness) due to the hot water treatment (AC sterilization), and occurrence or otherwise of hemolysis and thrombus are shown in Table 4. Agglutination of hollow fiber membranes occurred due to the hot water treatment (AC sterilization).

TABLE 1

|  | dicarboxylic acid component | diamine component | | | terminal blocking agent benzoic | catalyst phosphorous | intrinsic | glass transition | | equilibrium |
|---|---|---|---|---|---|---|---|---|---|---|
|  | terephthalic acid (molar ratio) | NMDA (molar ratio) | MODA (molar ratio) | [NMDA/(NMDA + MODA)] × 100 (%) | acid (molar ratio) | acid (wt %) | viscosity [η] (dl/g) | temperature (° C.) | kind of obtained polyamide | water absorption (%) |
| Example 1 | 1.97 | 1 | 1 | 50 | 0.06 | 0.1 | 1.37 | 125 | PA9MT[1] | 3.2 |
| Example 2 | 1.97 | 1 | 1 | 50 | 0.06 | 0.1 | 1.37 | 125 | PA9MT | 3.2 |
| Example 3 | 1.97 | 1 | 1 | 50 | 0.06 | 0.1 | 1.37 | 125 | PA9MT | 3.2 |
| Example 4 | 1.97 | 1.7 | 0.3 | 85 | 0.06 | 0.1 | 1.22 | 126 | PA9MT | 3.1 |
| Example 5 | 1.97 | 1.3 | 0.7 | 65 | 0.06 | 0.1 | 1.24 | 126 | PA9MT | 3.1 |
| Example 6 | 1.97 | 0.6 | 1.4 | 30 | 0.06 | 0.1 | 1.00 | 124 | PA9MT | 3.4 |
| Example 7 | 1.97 | 2 | 0 | 100 | 0.06 | 0.1 | 1.21 | 127 | PA9T[2] | 3.0 |
| Example 8 | 1.97 | 1 | 1 | 50 | 0.06 | 0.1 | 0.80 | 123 | PA9MT | 3.3 |
| Example 9 | 1.97 | 1 | 1 | 50 | 0.06 | 0.1 | 1.37 | 125 | PA9MT | 3.2 |
| Comparative Example 1 | — | — | — | — | — | — | — | 148 | PA6-3-T[3] | 12.1 |
| Comparative Example 2 | — | — | — | — | — | — | — | 124 | PA6IT[4] | 10.9 |

[1] polyamide comprising diamine unit comprising 1,9-nonanediamine unit and 2-methyl-1,8-octanediamine unit, and dicarboxylic acid unit comprising terephthalic acid unit
[2] polyamide comprising diamine unit comprising 1,9-nonanediamine unit, and dicarboxylic acid unit comprising terephthalic acid unit
[3] trimethylhexamethyleneterephthalamide (Trogamide T-5000, Degussa AG)
[4] polyamide (Novamid X-21, Mitsubishi Engineering-Plastics Corporation) comprising diamine unit comprising hexamethylenediamine unit, and dicarboxylic acid unit comprising terephthalic acid unit and isophthalic acid unit

TABLE 2

|  | Polyamide (wt %) | PVP[1] (wt %) | Water (wt %) | Additive (LiCl) (wt %) | Solvent (wt %) | |
|---|---|---|---|---|---|---|
| Example 1 | 15 | 3 | 2 | 5 | NMP | 75 |
| Example 2 | 15 | 3 | 2 | 5 | NMP | 75 |
| Example 3 | 10 | 2 | 5 | 5 | NMP | 78 |
| Example 4 | 15 | 3 | 0 | 5 | NMP | 77 |
| Example 5 | 15 | 3 | 0 | 5 | NMP | 77 |
| Example 6 | 15 | 3 | 2 | 5 | NMP | 75 |
| Example 7 | 10 | 0 | 0 | 5 | NMP | 85 |
| Example 8 | 16 | 3 | 2 | 5 | NMP | 74 |
| Example 9 | 10 | 0 | 0 | 5 | DMAc | 85 |
| Comparative Example 1 | 15 | 3 | 2 | 0 | DMSO | 80 |
| Comparative Example 2 | 13 | 2 | 0 | 0 | DMSO | 85 |

[1] K-90, BASF

TABLE 3

|  | Detail of membrane structure | | | Size of hollow fiber | | |
|---|---|---|---|---|---|---|
|  |  | support layer | dense layer | | | |
|  | support layer structure | outer surface average pore size (μm) | inner surface average roughness (nm) | outer diameter (μm) | inner diameter (μm) | membrane thickness (μm) |
| Example 1 | network gradient structure | 1 | 5.1 | 250 | 200 | 25 |
| Example 2 | network gradient structure | 0.6 | 5.4 | 220 | 180 | 20 |
| Example 3 | finger void structure | 0.2 | 5.0 | 261 | 198 | 32 |
| Example 4 | network gradient structure | 0.8 | 4.8 | 300 | 200 | 50 |
| Example 5 | network gradient structure | 0.9 | 4.9 | 298 | 202 | 48 |
| Example 6 | network gradient structure | 1.7 | 5.0 | 261 | 189 | 36 |
| Example 7 | finger void structure | 0.13 | 2.6 | 309 | 219 | 45 |

TABLE 3-continued

|  | Detail of membrane structure | | | Size of hollow fiber | | |
|---|---|---|---|---|---|---|
|  | support layer structure | support layer outer surface average pore size (μm) | dense layer inner surface average roughness (nm) | outer diameter (μm) | inner diameter (μm) | membrane thickness (μm) |
| Example 8 | network gradient structure | 1.3 | 5.5 | 342 | 240 | 51 |
| Example 9 | finger void structure | 0.11 | 2.3 | 368 | 250 | 59 |
| Comparative Example 1 | network homogeneous structure | 0.08 | 0.9 | 288 | 200 | 44 |
| Comparative Example 2 | finger void structure | less than 0.01[1] | 0.2 | 251 | 183 | 34 |

[1] Measurement with electron micrograph (maximum magnification X6000) was not obtainable.

TABLE 4

| | Membrane performance | | | | | | Changes in size | | | |
|---|---|---|---|---|---|---|---|---|---|---|
| | Rej (%) | | Urea CL (ml/min) | | $\beta_2$-MG CL (ml/min) | | fiber length change (%) | inner diameter change (%) | membrane thickness change (%) | Occurrence of hemolysis or thrombus |
| | before AC sterilization | after AC sterilization | before AC sterilization | after AC sterilization | before AC sterilization | after AC sterilization | | | | |
| Example 1 | 99.82 | 99.81 | 185 | 186 | 58 | 60 | −8.4 | 2.7 | −6.1 | none |
| Example 2 | 98.31 | 98.31 | 189 | 187 | 69 | 70 | −4.8 | −1.4 | 1.7 | none |
| Example 3 | 98.67 | 98.78 | 181 | 181 | 72 | 70 | −6.0 | 0.5 | −4.1 | none |
| Example 4 | 99.92 | 99.93 | 184 | 182 | 47 | 48 | −1.4 | 1.0 | −1.8 | none |
| Example 5 | 99.88 | 99.86 | 183 | 185 | 49 | 48 | −3.2 | −0.7 | −2.5 | none |
| Example 6 | 98.20 | 98.41 | 184 | 180 | 64 | 59 | −9.8 | −8.0 | −5.5 | none |
| Example 7 | 99.91 | 99.90 | 175 | 175 | 35 | 36 | −0.2 | 1.8 | −1.1 | none |
| Example 8 | 99.10 | 99.03 | 176 | 175 | 38 | 35 | −8.7 | −4.0 | −2.2 | none |
| Example 9 | 99.40 | 99.46 | 178 | 176 | 35 | 35 | −9.0 | 2.0 | −6.4 | none |
| Comparative Example 1 | 99.76 | not measurable | 173 | not measurable | 22 | not measurable | −33.5 | −45.7 | −38.0 | none |
| Comparative Example 2 | 97.03 | not measurable | 168 | not measurable | 18 | not measurable | −19.4 | 2.4 | −0.4 | none |

The hollow fibers of Examples 1-9 and Comparative Examples 1-2 all had a membrane structure wherein the inner layer was a dense layer and the outer layer was a support layer that also acts as a support of the dense layer. These support layers each had a structure shown in Table 3.

As is clear from Table 4, the hollow fibers prepared in Examples 1-9 showed extremely small dimensional changes (having high dimensional stability) even after AC sterilization, and membrane performance showed almost no changes because a polyamide having an equilibrium water absorption of not more than 10% was used as a starting material. In addition, agglutination of hollow fiber membranes due to the hot water treatment (AC sterilization) did not occur. In contrast, the hollow fibers prepared in Comparative Examples 1 and 2 showed insufficient dimensional stability after AC sterilization (greater dimensional changes), and the membrane performance was markedly degraded (in practice, frequent occurrence of crushed hollow fiber and leakage prevented measurement of urea clearance, $\beta_2$-MG clearance and albumin rejection) because a polyamide having an equilibrium water absorption of more than 10% was used as a starting material. Moreover, agglutination of hollow fiber membranes due to the hot water treatment (AC sterilization) occurred.

INDUSTRIAL APPLICABILITY

As is clear from the above explanation, according to the present invention, a porous membrane superior in hot water resistance can be provided using polyamide as a material. The porous membrane obtained in the present invention shows extremely small dimensional changes even after a hot water treatment, and can make a medical separation membrane permitting an AC sterilization treatment. In addition, since contact with blood does not result in hemolysis or thrombus, the membrane becomes particularly useful as a hemodialysis membrane among medical separation membranes.

This application is based on application No. 2002-204733 filed in Japan, the contents of which are incorporated hereinto by reference.

The invention claimed is:

1. A porous membrane comprising a polyamide having an equilibrium water absorption of not more than 10% as a main material, wherein the polyamide having an equilibrium water absorption of not more than 10% comprises a dicarboxylic acid component comprising 60-100 mol% of terephthalic acid and a diamine component comprising 60-100 mol% of 1,9-nonanediamine and/or 2-methyl-1,8-octanediamine.

2. The porous membrane of claim 1, wherein the polyamide having an equilibrium water absorption of not more than 10% is contained in a proportion of 50-100 wt% in the material.

3. The porous membrane of claim 1, wherein the material further comprises polyvinylpyrrolidone.

4. The porous membrane of claim 1, wherein a molar ratio of the 1,9-nonanediamine and 2-methyl-1,8-octanediamine in the diamine component is 100:0-10:90.

5. The porous membrane of claim 1, wherein the polyamide having an equilibrium water absorption of not more than 10% comprises a molecular chain terminal group blocked with a terminal blocking agent by not less than 10% thereof.

6. The porous membrane of claim 5, wherein the terminal blocking agent is benzoic acid.

7. The porous membrane of claim 1, wherein the polyamide having an equilibrium water absorption of not more than 10% has a glass transition point of not less than 60° C.

8. The porous membrane of claim 1, wherein the polyamide having an equilibrium water absorption of not more than 10% shows an intrinsic viscosity of 0.4-3.0 dl/g as measured in concentrated sulfuric acid at 30° C.

9. The porous membrane of claim 1, which has a membrane thickness of 3-2000 μm.

10. The porous membrane of claim 1, which is an asymmetric membrane comprising a dense layer and a support layer.

11. The porous membrane of claim 10, wherein the dense layer has an average surface roughness of 1-10 nm.

12. The porous membrane of claim 10, wherein the support layer comprises pores having an average pore size of 0.01-100 μm on the surface.

13. The porous membrane of claim 1, which has a $\beta 2$-microglobulin clearance of not less than 35 mL/min.

* * * * *

UNITED STATES PATENT AND TRADEMARK OFFICE
CERTIFICATE OF CORRECTION

PATENT NO.        : 7,364,660 B2                                            Page 1 of 1
APPLICATION NO.   : 10/520864
DATED             : April 29, 2008
INVENTOR(S)       : Takai et al.

It is certified that error appears in the above-identified patent and that said Letters Patent is hereby corrected as shown below:

ON THE TITLE PAGE:

(57) Abstract:
　　　　Line 3: "not.more"
　should read
　　　--not more--

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,364,660 B2  Page 1 of 1
APPLICATION NO. : 10/520864
DATED : April 29, 2008
INVENTOR(S) : Takai et al.

It is certified that error appears in the above-identified patent and that said Letters Patent is hereby corrected as shown below:

ON THE TITLE PAGE:

(75) Inventors:
    Masato Takai, Ibaraki (JP)
should read
    Masato Takai, Kashima (JP)

Please insert heading after item (87);
-- (30) Foreign Application Priority Data
July 10, 2003    [WO]   WIPO   PCT/JP03/008758
July 12, 2002    (JP)          2002-204733 --

Signed and Sealed this

Twenty-first Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,364,660 B2 Page 1 of 1
APPLICATION NO. : 10/520864
DATED : April 29, 2008
INVENTOR(S) : Takai et al.

It is certified that error appears in the above-identified patent and that said Letters Patent is hereby corrected as shown below:

ON THE TITLE PAGE:

(75) Inventors:
    Masato Takai, Ibaraki (JP)
should read
    Masato Takai, Kashima (JP)

Please insert heading after item (87);
    -- (30) Foreign Application Priority Data
    July 12, 2002    (JP)    2002-204733 --

This certificate supersedes the Certificate of Correction issued July 21, 2009.

Signed and Sealed this

Sixteenth Day of February, 2010

David J. Kappos
*Director of the United States Patent and Trademark Office*